United States Patent
Kawai

(10) Patent No.: US 7,426,857 B2
(45) Date of Patent: Sep. 23, 2008

(54) FLOW DETECTOR ELEMENT OF THERMOSENSIBLE FLOW SENSOR

(75) Inventor: Masahiro Kawai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/605,454

(22) Filed: Nov. 29, 2006

(65) Prior Publication Data

US 2007/0295083 A1     Dec. 27, 2007

(30) Foreign Application Priority Data

May 15, 2006 (JP) ............................. 2006-135021

(51) Int. Cl.
*G01F 1/68* (2006.01)
(52) U.S. Cl. ................................. 73/204.26
(58) Field of Classification Search ............. 73/204.26, 73/204.25, 204.11, 204.16, 204.17, 204.19, 73/204.22, 204.23, 204.18
See application file for complete search history.

(56) References Cited

U.S. PATENT DOCUMENTS

| 5,452,610 | A | 9/1995 | Kleinhans et al. |
| 5,936,157 | A | 8/1999 | Yamashita et al. |
| 6,314,807 | B1 | 11/2001 | Kawai et al. |
| 6,725,716 | B1 * | 4/2004 | Kawai et al. .............. 73/204.26 |
| 6,805,003 | B2 * | 10/2004 | Ueki et al. ................ 73/204.26 |
| 6,886,402 | B2 * | 5/2005 | Kikuchi et al. ............ 73/204.25 |

FOREIGN PATENT DOCUMENTS

| JP | 5-164575 A | 6/1993 |
| JP | 6-249693 A | 9/1994 |
| JP | 8-29226 | 2/1996 |
| JP | 11-023338 | 1/1999 |
| JP | 3364115 B2 | 10/2002 |
| JP | 3455473 B2 | 7/2003 |
| KP | 2001-0014671 A | 2/2001 |

OTHER PUBLICATIONS

Japanese Office Action dated Apr. 15, 2008, with completed English language translation.

* cited by examiner

*Primary Examiner*—Jewel V Thompson
(74) *Attorney, Agent, or Firm*—Sughrue Mion, PLLC

(57) ABSTRACT

Detection accuracy of flow rates is higher even when the temperature of fluid is varied or when there is any difference between temperature of fluid and that around a thermosensible flow sensor. A thermosensible detector element comprises an insulating support film formed on the surface of a plate-like substrate, a heat resistor and a fluid temperature-measuring resistor made of thermosensible resistive films formed on this support film, an insulating protective film formed on this thermosensible resistive film, and cavities and formed under respective thermosensible resistive films by removing partially the plate-like substrate, and in which flow velocity of fluid is measured on heat transfer phenomenon from the portion heated by the heat resistor to fluid, and top surface of the cavity located under the fluid temperature-measuring resistor is formed within the part where the fluid temperature-measuring resistor is located.

2 Claims, 7 Drawing Sheets

FLOW DETECTOR ELEMENT OF THERMOSENSIBLE FLOW SENSOR

BACKGROUND OF THE INVENTION

1. Field of the Invention

The present invention relates to a thermosensible flow sensor for measuring, for example, the intake air flow of an internal combustion engine and, more particularly, to a flow detector element of a thermosensible flow sensor for measuring the flow velocity or the flow rate of fluid on the basis of heat transfer phenomenon from a heat generator or a part heated by the heat generator to the fluid.

2. Description of the Related Art

A conventional thermosensible flow sensor is the one in which there are provided on a substrate a heat resistor and a fluid temperature-measuring resistor, and a cavity that is formed by removing partially the substrate is located under the heat resistor, as disclosed in the Japanese Patent Publication No. 3455473.

Furthermore, another conventional thermosensible flow sensor is the one in which there are provided on a substrate a heat resistor and a fluid temperature-measuring resistor, and cavities are formed individually under each of these heat resistor and fluid temperature-measuring resistor, as disclosed in the Japanese Patent Publication (unexamined) No. 249693/1994.

In the case where a thermosensible flow sensor as described above is mounted onto an automobile to make an engine control, there are some cases in which a throttle is fully open to make a quick start from in the state that an idle operation state continues under at a constant temperature, and then the temperature in an engine room is sufficiently raised.

In this case, under the idle operation, the engine room is at high temperature, and in a thermosensible flow sensor mounted in the engine room, the temperature of an air current flowing through the thermosensible flow sensor section, and the temperature of an element support portion of the thermosensible flow sensor are both in a high-temperature state. When a quick start and a quick acceleration are made at such time, although the engine room is still remained at high temperature, an air current flowing through the thermosensible flow sensor and the element support portion will be cooled.

In this respect, in the above-mentioned Japanese Patent Publication No. 3455473, a heat resistor and a fluid temperature-measuring resistor are formed on a substrate, and a cavity is formed under the heat resistor alone. Therefore, the heat capacity at the fluid temperature-measuring resistor section becomes larger, thus thermal response delays occur with respect to the change of temperatures of an air current at the fluid temperature-measuring resistor, and fluid temperature detection error occurs, eventually resulting in the occurrence of error in detection values of flow rates.

Moreover, in the above-mentioned Japanese Patent Publication (unexamined) No. 249693/1994, a cavity is formed also under the fluid temperature-measuring resistor as is under the heat resistor, so that even if the temperature of fluid is varied, it is possible to reduce detection error at the fluid temperature-measuring resistor. However, a problem exists in that the thermal response at the fluid temperature-measuring resistor is too early.

That is, the heat capacity at an element support portion is large, so that thermal response delays will occur at the element support portion, and thus off-balance will occur between the thermal response of the fluid temperature-measuring resistor and the thermal response of the element support portion. As a result, a problem exists in the occurrence of error of detection values of flow rates.

SUMMARY OF THE INVENTION

The present invention has been made to solve the aforementioned problems, and has an object of providing a highly reliable thermosensible flow sensor in which by forming a cavity within a range of (to locate inside) a portion where a fluid temperature-measuring resistor is located, detection accuracy of flow rates is made higher even in the case where the temperature of fluid is varied, or where there is any difference between the temperature of fluid and the temperature around the thermosensible flow sensor, and furthermore the strength at the cavity portion is made higher.

In a flow detector element for a thermosensible flow sensor according to the invention, a support film is formed on the surface of a substrate, as well as a heat resistor and a fluid temperature-measuring resistor that are made of a thermosensible resistive film are formed on the support film, and there are provided under the heat resistor and the fluid temperature-measuring resistor cavities formed by removing a part of the substrate. The top surface of the cavity located under the fluid temperature-measuring resistor is formed within a portion where the fluid temperature-measuring resistor is located.

As a result, it is possible to achieve higher detection accuracy of flow rates even in the case where the temperature of fluid is varied, or where there is a difference between the temperature of fluid and the temperature around the thermosensible flow sensor, and further it is possible to make the strength at the cavity portion higher.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
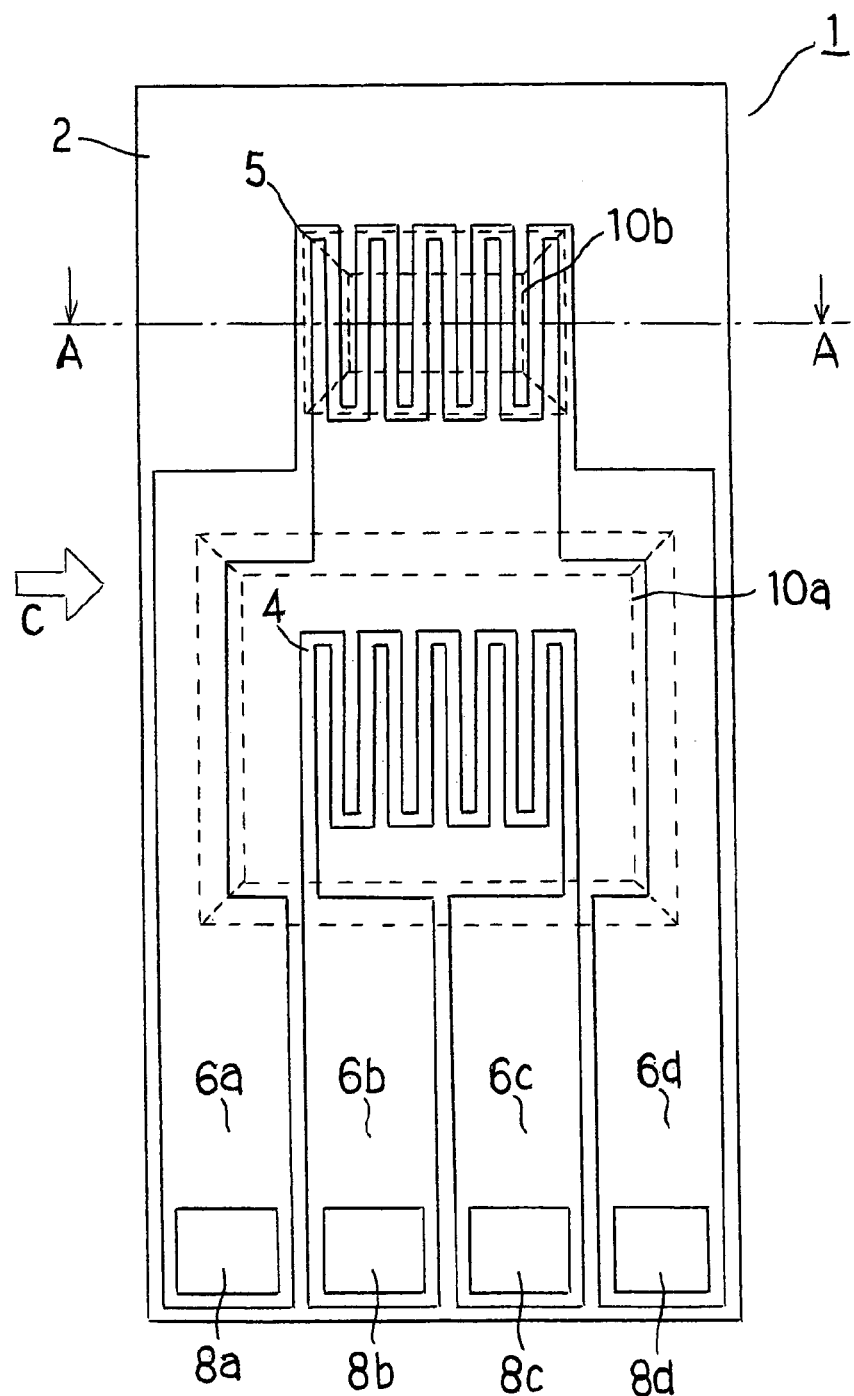
FIG. 1 is a plan view showing a flow detector element for use in a thermosensible flow sensor according to a first preferred embodiment of the present invention.
Figure 2:
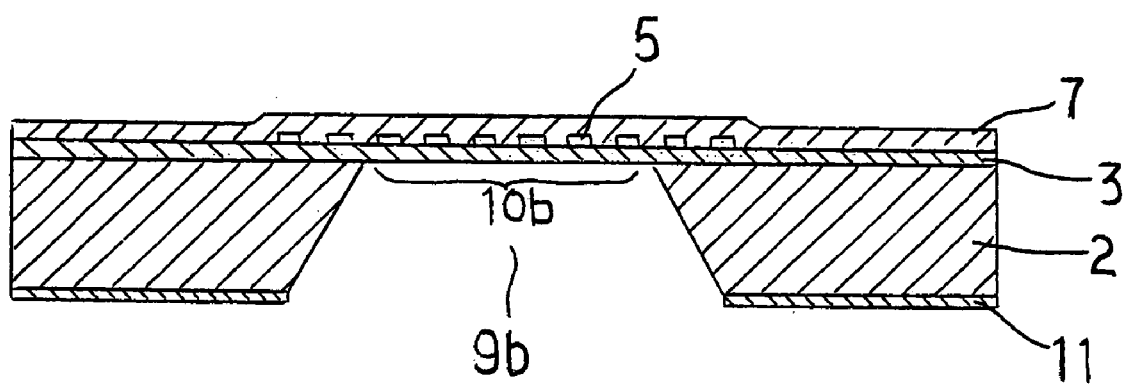
FIG. 2 is a sectional view taken along the line A-A in FIG. 1.

A preferred embodiment according to the present invention is hereinafter described. FIG. 1 is a plan view showing a flow detector element for use in a thermosensible flow sensor according to a first embodiment of the invention, and FIG. 2 is a sectional view taken along the line A-A in FIG. 1. FIG. 1 shows a state in which a protective film is removed. In addition, FIGS. 1 and 2 are not drawn in actual dimensional ratio to make the construction clearly understandable. Each drawing shown hereinafter is not drawn in actual dimensional ratio as well.

With reference to FIGS. 1 and 2, a substrate 2 in a flow detector element 1 is made of silicone, and a support film 3 having insulation properties and made of silicon nitride is formed all over the top surface of the substrate 2. Furthermore, there are formed on the support film 3 a heat resistor 4 and fluid temperature-measuring resistor 5 that are formed of a thermosensible resistive film, and lead patterns 6a to 6d. Further, a protective film 7 having insulation properties and made of silicon nitride is formed on the support film 3 so as to cover the heat resistor 4, the fluid temperature-measuring resistor 5, and the lead patterns 6a to 6d. In addition, the thermosensible resistive film is a resistive film that is made of material of which resistance value depends on temperatures, and is, for example, platinum.

By removing the protective film 7 located over the end portions of each of the lead patterns 6a to 6d, and exposing the lead patterns, electrodes 8a to 8d are formed. The electrodes 8a to 8d, then, will be electrically connected externally by known methods such as wire bonding, whereby the heat resistors 4 and the fluid temperature-measuring resistor 5 will be electrically connected externally via the lead patterns 6a to 6d and the electrodes 8a to 8d.

Further, parts of the substrate 2 located under the heat resistor 4 and the fluid temperature-measuring resistor 5 are removed forming a trapezoidal shape up to the support film 3, and then a cavity 9a and a cavity 9b, being spaces, are formed. In this manner, the heat resistor 4 is sandwiched between the support film 3 and the protective film 7, whereby a diaphragm 10a functioning as a low heat capacity part is formed. This diaphragm 10a will be surrounded and held by the substrate 2.

Likewise the fluid temperature-measuring resistor 5 is sandwiched between the support film 3 and the protective film 7, whereby a diaphragm 10b functioning as a low heat capacity part is formed. This diaphragm 10b is surrounded and held by the substrate 2.

Now, a manufacturing method of a flow detector element 1 constructed as mentioned above is described. First, a silicon nitride film of 1 μm in thickness is formed all over the top surface of the substrate 2 of 0.4 μm in thickness by such method as sputtering, CVD (chemical vapor deposition) or the like, thereby forming a support film 3 on the substrate 2.

Subsequently, a platinum film of 0.2 μm in thickness is formed by such method as vapor deposition, sputtering or the like all over the surface of the substrate 2 on which the support film 3 is formed, and then the platinum film is subjected to patterning by such method as photoengraving, wet etching, dry etching or the like, thereby forming the heat resistor 4, the fluid temperature-measuring resistor 5 and the lead patterns 6a to 6d.

Further, a silicon nitride film of 1 μm in thickness is formed all over the surface of the substrate 2 by such method as sputtering, CVD or the like, whereby the protective film 7 is formed. Thereafter, the protective film 7 located over the end portions of the lead patterns 6a to 6b is removed by such method as photoengraving, wet etching, dry etching or the like, thereby forming the electrodes 8a to 8d.

Then, a resist is applied to all over the back face of the substrate 2 as a backside protective film 11, and etching holes are formed using, e.g., photoengraving. Thereafter, for example, alkali etching is applied, and a part of the substrate 2 is removed from the backside to the support film 3, to form diaphragms 10a and 10b.

Examples of etching liquids (etchants) to be used herein include KOH, TMAH (Tetra Methyl Ammonium Hydroxide), and NaOH. Additionally, the diaphragm 10a is formed to be in size of 1.5 mm in length and 2 mm in width. The diaphragm 10b is formed to be in size of 0.5 mm in length and 0.7 mm in width. On the other hand, the heat resistor 4 and the fluid temperature-measuring resistor 5 are formed so that centers thereof coincide with those of the diaphragms 10a and 10b, and so as to be in size of 0.8 mm in length and 1 mm in width.

That is, according to the invention, the diaphragm 10b is constructed to be smaller than the diaphragm 10b, and further the diaphragm 10b is formed so as to locate inside the fluid temperature-measuring resistor 5, and to be smaller than the fluid temperature-measuring resistor 5. In this manner, the top surface of the cavity 9b is constructed to locate within the portion where the fluid temperature-measuring resistor 5 is located.

Figure 3:
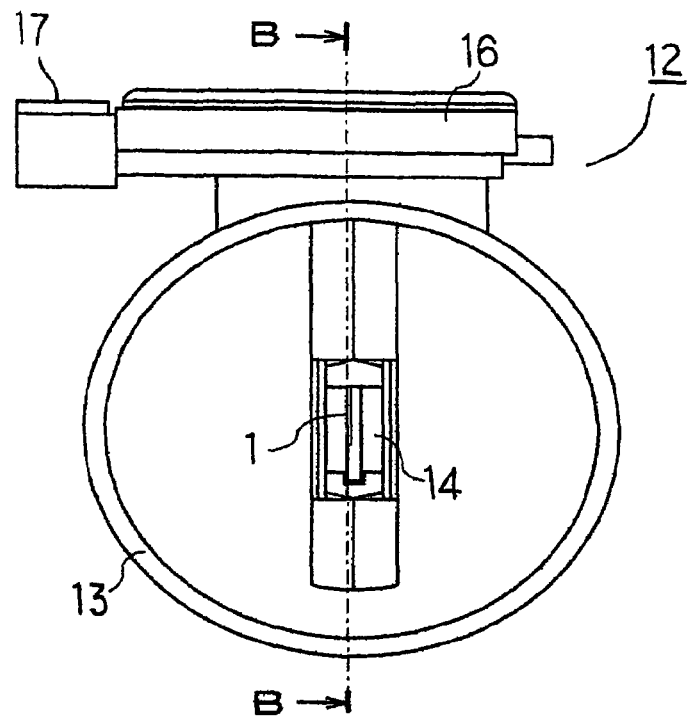
FIG. 3 is a front view showing the thermosensible flow sensor according to the first embodiment of the invention.
Figure 4:
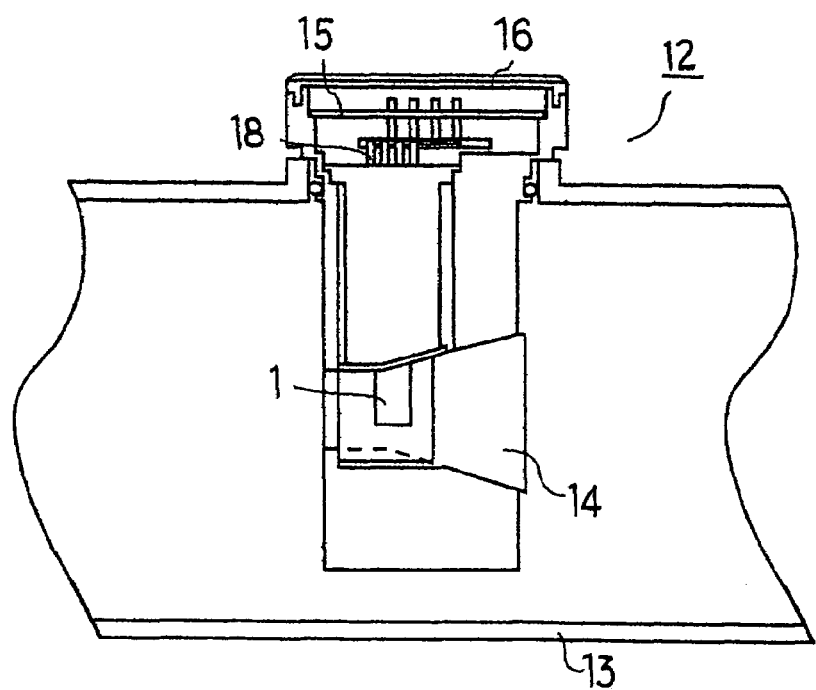
FIG. 4 is a sectional view taken along the line B-B in FIG. 3.

Now, construction of a thermosensible flow sensor 12 using a flow detector element 1 that is constructed as described above is described referring to FIGS. 3 and 4. FIG. 3 is a front view showing the thermosensible flow sensor 12 according to the first embodiment of the invention. FIG. 4 is a sectional side view taken along line B-B in FIG. 3.

In the drawings, the thermosensible flow sensor 12 includes a detector tube passage 13 and a main passage 14, being a passage of fluid to be measured. These detector tube passage 13 and main passage 14 are disposed coaxially. Further, the thermosensible flow sensor 12 is formed of a case 16 in which a control circuit board 15 is contained, a connector 17 that supplies an electric power to the thermosensible flow sensor 12 and fetches outputs, and a flow detector element 1 located in the detector tube passage 13.

Further, the electrodes 8a to 8d of the flow detector element 1 and the control circuit board 15 are in electrical connection through lead wires 18. The flow detector element 1 is located in the detector tube passage 13 so that the surface of the plate-like substrate 2 is in parallel to a flow direction C of fluid, as well as so that the surface of the plate-like substrate 2 is exposed to the fluid.

Figure 5:
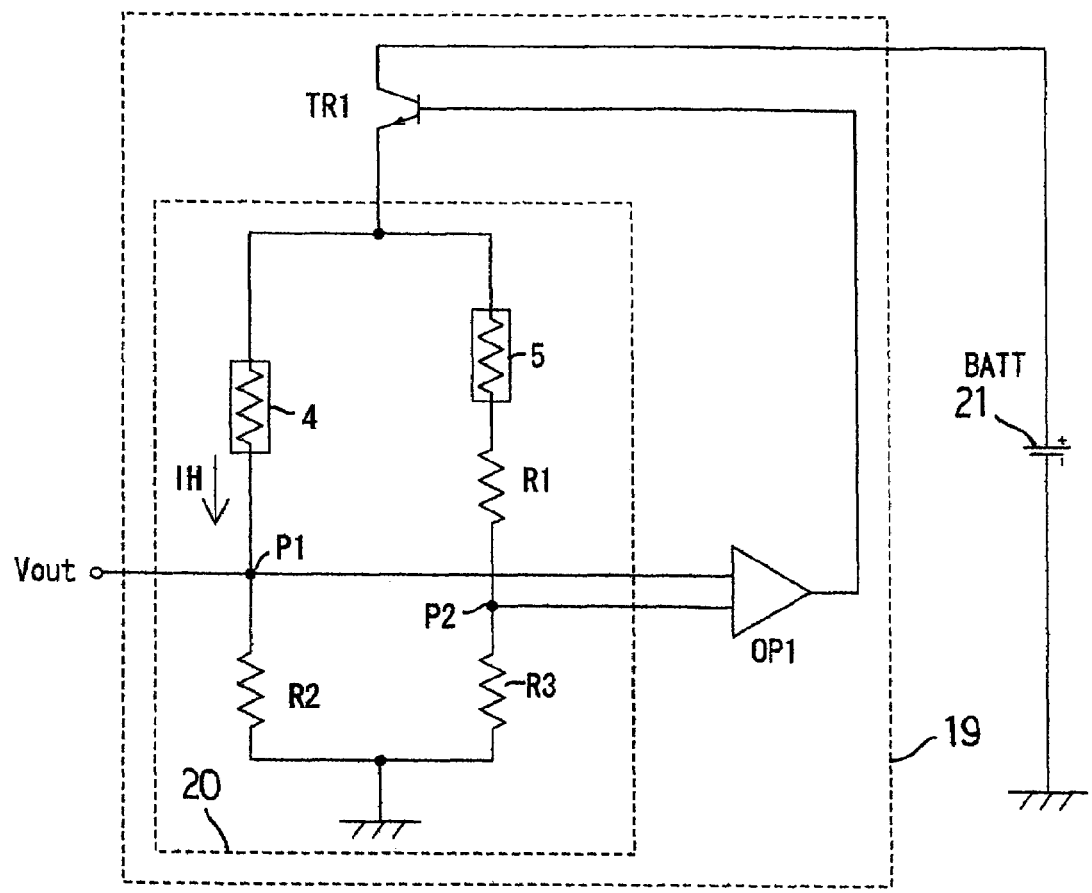
FIG. 5 is a circuit diagram showing a control circuit of the thermosensible flow sensor according to the first embodiment of the invention.

FIG. 5 is a circuit diagram showing a control circuit of the thermosensible flow sensor 12, and a control circuit 19 forms a bridge circuit 20 including the fluid temperature-measuring resistor 5 and the heat resistor 4. Furthermore, the control circuit 19 is constructed of fixed resistors R1, R2 and R3, an operational amplifier OP1, a transistor TR1, and a power source 21. Parts of the control circuit other than the fluid temperature-measuring resistor 5 and the heat resistor 4 are mounted on the control circuit board 15.

In addition, the control circuit 19 is arranged so as to hold the heat resistor 4 at a constant value higher than an ambient temperature to be detected by the fluid temperature-measuring resistor 5. For example, the temperature of the heat resistor 4 is controlled so as to be maintained at a temperature higher by 200° C. than an ambient temperature that is detected by the fluid temperature-measuring resistor 5.

On the other hand, the temperature to be detected by the fluid temperature-measuring resistor 5 is substantially equal to the ambient temperature (the temperature of fluid flowing over the fluid temperature-measuring resistor 5). The fluid temperature-measuring resistor 5 is used for suppressing effects of the fluid temperature with respect to measured signals. That is, electric potentials at P1 point and P2 point in the control circuit 19 are controlled to be substantially identical by means of the operational amplifier OP1. Even if the temperature of fluid is varied, modification is made by means of the fluid temperature-measuring resistor 5, so that the heat resistor 4 is affected with the flow velocity alone.

Further, in the control circuit 19, a heating current IH of the heat resistor 4 is controlled. When the flow velocity of fluid comes to be higher, heat transfer from the heat resistor 4 to fluid comes to be larger. Thus, to keep the average temperature of the heat resistor 4 at a predetermined value, a heating current IH is increased. By detecting this heating current IH as a voltage Vout at both terminals across the resistor R2, the flow velocity or the flow rate flowing in a passage having a predetermined passage cross section can be detected.

When letting a resistance value of the heat resistor 4 RH, an average temperature of the heat resistor 4 TH, a measured fluid temperature TA, and a flow rate flowing through a passage having a predetermined passage cross section Q, the following expression (1) holds.

$$IH^2 \times RH = (a + b \times Q^n) \times (TH - TA) \quad (1)$$

where: a, b, and n are constants to be determined depending on aspects of the flow detector element 1.

The constant a is a coefficient corresponding to the amount of heat independent of the flow rate, and most thereof is heat conduction loss in transfer from the heat resistor 4 to the plate-like substrate 2. The constant b is a coefficient corresponding to a forced-convection heat transfer. The constant n is a value to be determined depending on the state of flow in the vicinity of the heat resistor 4, and this value is approximately 0.5.

As is understood from the expression (1), there is no relationship between the amount of heat corresponding to constant a, and the flow rate.

In the above description, the direct heating control system in which a heat resistor 4 and a fluid temperature-measuring resistor 5 form a bridge circuit 20 is described. However, the indirect heat control system in which a temperature measuring resistor is located in the vicinity of the heat resistor 4, and this temperature measuring resistor and a the fluid temperature-measuring resistor form a bridge circuit, is also on the above-mentioned theory.

On the supposition of mounting the above-mentioned thermosensible flow sensor on a vehicle to make an engine control, the case where a throttle is fully open to make a quick start from the state that the idle operation state is left as it is, and then the temperature in an engine room is sufficiently raised, is hereinafter described.

In the thermosensible flow sensor 12 to be mounted in an engine room, the engine room is at high temperature under the idle operation state, and thus fluid flowing through the thermosensible flow sensor 12 and the element support portion of the thermosensible flow sensor 12 are at high temperature. When making a quick start and a quick acceleration in such a state, although the engine room is still at high temperature, fluid flowing through the thermosensible flow sensor 12 and the element support portion will be cooled.

Figure 6:
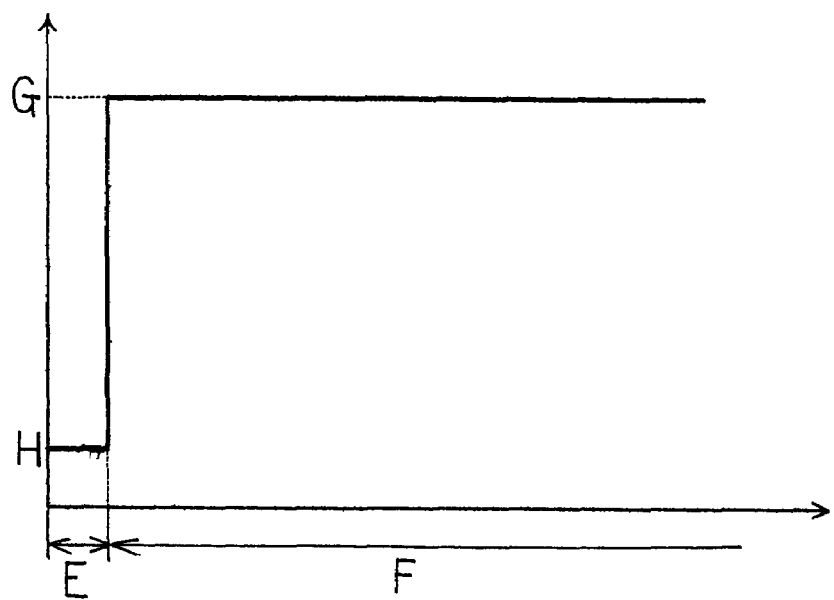
FIG. 6 is a chart showing the change of flow rates of the thermosensible flow sensor according to the first embodiment of the invention.
Figure 7:
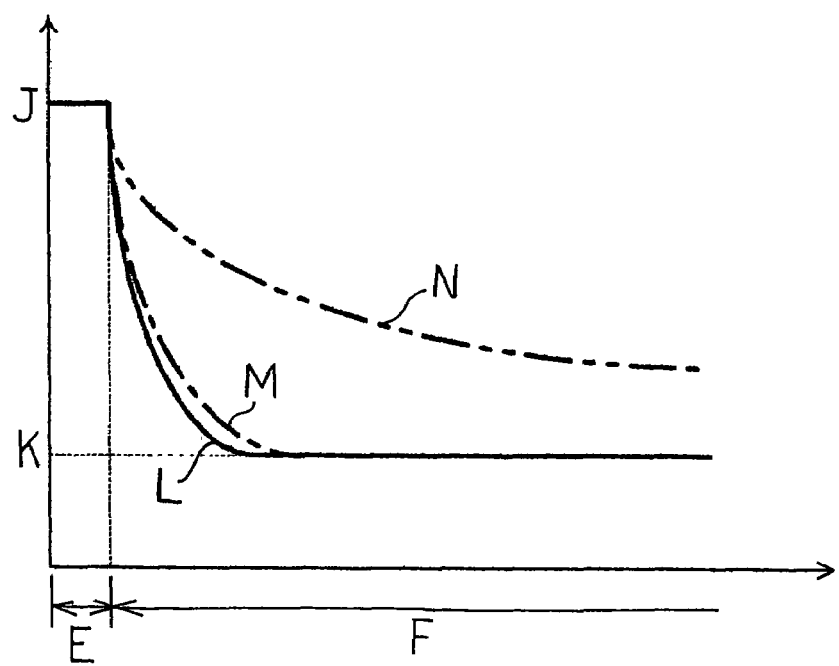
FIG. 7 is a chart showing the change with time of intake air temperature, temperature of a fluid temperature-measuring resistor, and temperature of an element support portion of a conventional thermosensible flow sensor.

FIG. 6 is a chart showing the change with time of flow rates in the above-mentioned case. In FIG. 6, a vertical scale indicates flow rate and a horizontal scale indicates time. A range E indicates an idle operation state and a range F indicates a quick acceleration state. Furthermore a point G indicates flow rate in the case where a throttle is fully open, and a point H indicates flow rate in the idle operation state. FIG. 7 is a chart showing the change with time of intake air temperature, temperature of a fluid temperature-measuring resistor and temperature of an element support portion in a thermosensible flow sensor in which a heat resistor and a fluid temperature-measuring resistor are formed on a substrate, as well as cavities of the same size are formed individually under the heat resistor and the fluid temperature-measuring resistor. In FIG. 7, a vertical scale indicates temperature and a horizontal scale indicates time. A point J indicates high temperature and a point K indicates ordinary temperature. Further a solid line L indicates intake air temperature, a dashed line M indicates temperature of the fluid temperature-measuring resistor, and a two-dot chain line N indicates temperature of the element support portion.

That is, in this case, a diaphragm that is located under a fluid temperature-measuring resistor is set to be larger than the fluid temperature-measuring resistor. As shown in FIG. 7, while the temperature of the fluid temperature-measuring resistor follows the change of intake air temperature, there are delays of the temperature of an element support portion with respect to the change of intake air temperature.

The reason is as follows. Since the fluid temperature-measuring resistor 5 is formed on the diaphragm 10b functioning as a low heat capacity part, the heat capacity thereof is small, thus the fluid temperature-measuring resistor is cooled, and the temperature thereof will follow the intake air temperature. On the other hand, since the element support portion is constructed of the substrate 2 and members for assembling the substrate 2, the heat capacity thereof becomes larger, and thus the temperature of the element support portion cannot follow the change of the intake air temperature.

An output voltage Vout from the thermosensible flow sensor 12 is determined depending on the heat transfer amount from the heat resistor 4 to fluid, and the heat conduction amount from the heat resistor 4 to the element support portion. The heat transfer amount from the heat resistor 4 to fluid is proportional to the temperature difference between the heat resistor 4 and fluid. The heat conduction amount from the heat resistor 4 to the element support portion is proportional to the temperature difference between the heat resistor 4 and the element support portion.

In the case where a time lag occurs between the change of temperature of the fluid temperature-measuring resistor 5 and the change of temperature of the element support portion, there will be any flow detection error. More specifically, since the change of temperature of the element support portion has delays with respect to the change of fluid temperature, the temperature difference between the heat resistor 4 and the element support portion comes to be smaller, values of a constant a in the expression (1) are changed, the heat conduction amount from the heat resistor 4 to the element support portion is decreased, an output Vout becomes lower, and then a flow detection error will occur.

Figure 8:
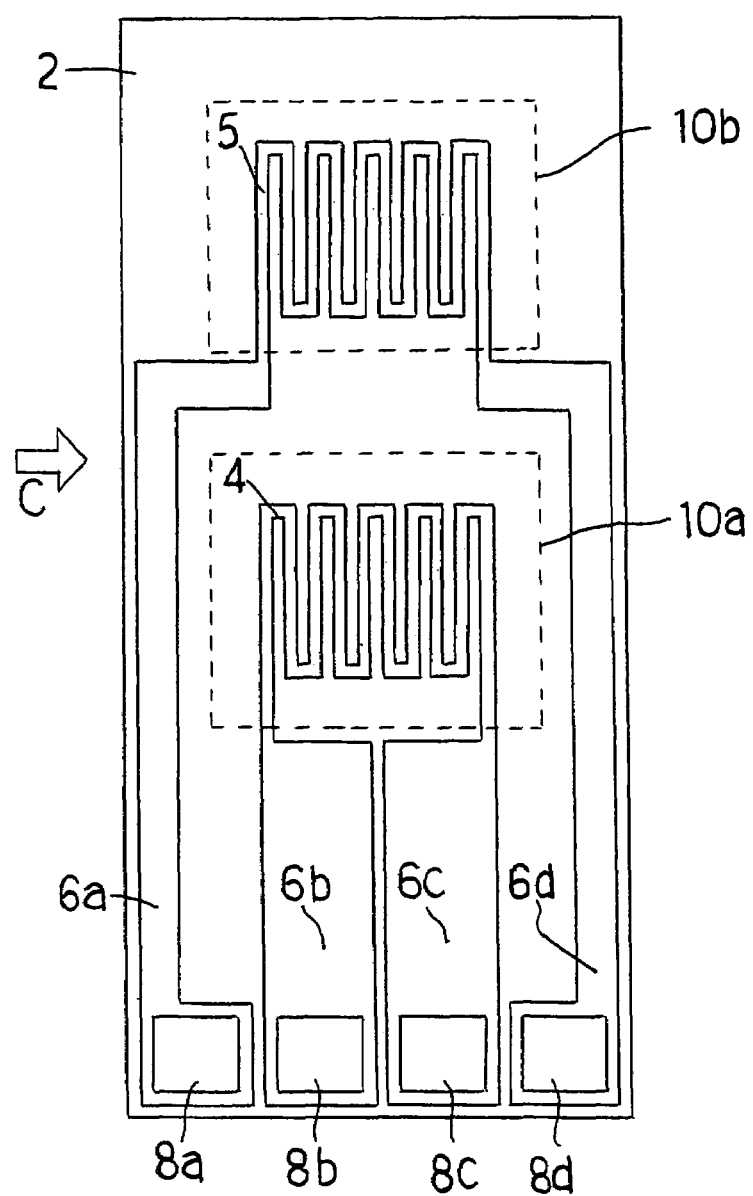
FIG. 8 is a plan view showing a flow detector element for use in the thermosensible flow sensor.

In such a case, it maybe an idea to design the following construction, in which, as is a flow detector element shown in FIG. 8, a diaphragm 10b formed under the fluid temperature-measuring resistor 5 is set to be larger than the fluid temperature-measuring resistor 5, whereby the heat capacity of the fluid temperature-measuring resistor 5 is made smaller; while, lead patterns 6a and 6d that are formed on the substrate 2 of a large heat capacity are made narrower, whereby resistance values of the lead patterns 6a and 6d are made larger.

Thus, the amount of heat generation comes to be larger at the lead patterns 6a and 6d, so that the thermal response at the fluid temperature-measuring resistor 5 and the lead patterns 6a and 6d can be made slow as compared with the case of FIG. 7. Therefore, the time lag between the thermal response of the fluid temperature-measuring resistor 5 and the thermal response of the element support portion can be eliminated.

In such construction, however, the resistances of the lead patterns 6a and 6b are obviously large as compared with the structure shown in FIG. 1, the rate of resistance values of the lead patterns 6a and 6d in a bridge circuit of FIG. 5 comes to be large as compared with FIG. 1. Thus, when heat is transferred from outside to the lead patterns 6a and 6d, the change of resistance values becomes larger, eventually resulting in the occurrence of flow detection error.

That is, in the case where there is a difference between the temperature of fluid flowing through the thermosensible flow sensor 12 and the temperature around the thermosensible flow sensor 12, heat from the connector 17 side is transferred, and thus the lead patterns 6a and 6d disposed in the vicinity of the electrodes 8a and 8d are affected by heat around the flow sensor 12 to be in temperature rise or temperature drop. Therefore, resistance values at the lead patterns 6a and 6d are largely varied as compared with the structure shown in FIG. 1, resulting in the occurrence of flow detection error due to the difference between the temperature of fluid and the temperature around the flow sensor 12.

Figure 9:
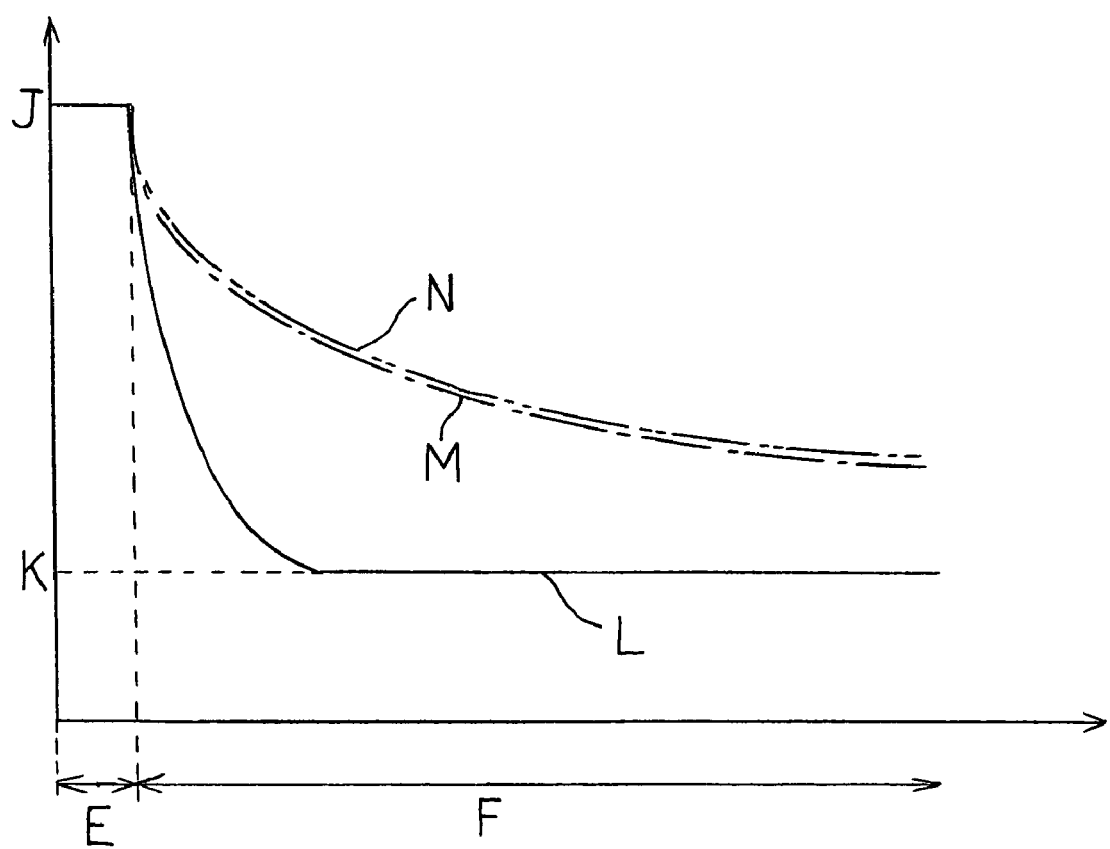
FIG. 9 is a chart showing the change with time of intake air temperatures, temperatures of a fluid temperature-measuring resistor, and temperatures of an element support portion at the thermosensible flow sensor according to the first embodiment of the invention.

Hence, in the flow detector element 1 according to the invention, as shown in FIG. 1, a cavity 10b is formed so as to locate within the fluid temperature-measuring resistor 5, thereby causing the heat capacity at the fluid temperature-measuring resistor 5 to be larger. FIG. 9 is a chart showing the change with time of intake air temperature at the thermosensible flow sensor 12, temperature of the fluid temperature-measuring resistor 5, and temperature at the element support portion. In FIG. 9, a vertical scale indicates temperature and a horizontal scale indicates time. A point J indicates high temperature and a point K indicates ordinary temperature. Further a solid line L indicates intake air temperature, a dashed line M indicates temperature of the fluid temperature-measuring resistor, and a two-dot chain line N indicates temperature of the element support portion. A range E indicates an idle operation state and a range F indicates a quick acceleration state.

As shown in FIG. 9, since the cavity 10b is constructed to be smaller than the fluid temperature-measuring resistor 5, the change of temperature of the fluid temperature-measuring resistor 5 becomes more late than the change of intake air temperature, and further coincides substantially with the change of temperature of the element support portion.

In the case where the change of temperature of the fluid temperature-measuring resistor 5 coincides with the change of temperature of the element support portion as mentioned above, there will be delays of the change of temperatures of the fluid temperature-measuring resistor 5 and the element support portion with respect to the change of intake air temperature. However, the temperature of the heat resistor 4 is so controlled as to be higher than the temperature of the fluid temperature-measuring resistor 5 only by a predetermined value at all times. Accordingly, as compared with the case of FIG. 7, in the case of FIG. 9, the temperature of the heat resistor 4 is high, so that on the supposition of the same temperature of fluid, the amount of heat transfer from the heat resistor 4 to fluid is increased, and this increase of the amount of heat transfer from the heat resistor 4 to fluid will offset the decrease of the amount of heat conduction from the heat resistor 4 to the element support portion due to thermal response delays of the element support portion, resulting in the reduction of flow detection error.

By employing the construction as described above, a time lag between the thermal response of the fluid temperature-measuring resistor 5 and the thermal response of the element support portion can be eliminated, thus in spite of the change of fluid temperatures, detection accuracy of flow rates can be maintained.

Further, since the lead patterns 6a and 6d that are formed in the vicinity of the electrodes 8a and 8d and might be affected by heat around the thermosensible flow sensor 12 have larger resistance values, even if there is a difference between the temperature of fluid flowing through the thermosensible flow sensor 12 and the temperature around the thermosensible flow sensor 12, the lead patterns 6a and 6d are unlikely to be affected by heat around the thermosensible flow sensor 12. Further, even if there is the mentioned temperature difference, detection accuracy of flow rates can be maintained.

Furthermore, by causing the volume of the cavity 10b formed under a fluid temperature-measuring resistor 5 to be smaller, it is possible to prevent the cavity 10b from being collided by solid particles such as sand or dust that is contained in fluid. In addition, the cavity 10b may be sufficiently resistant with respect to pressure waves due to back-fire, and thus it is possible to provide a highly reliable thermosensible flow sensor 12.

As described above, according to the invention, the following flow detector element 1 can be provided. That is, in this flow detector element 1, it is possible to eliminate the time lag between the change of temperature of the fluid temperature-measuring resistor 5 and the change of temperatures of the element support portion without being affected by wiring on the electrode side located on the substrate 2 while controlling the resistance value of the fluid temperature-measuring resistor 5. Further even if the temperature of fluid is changed, detection accuracy of flow rates is not impaired. Furthermore, even if there is a difference between the temperature of fluid and the temperature around the thermosensible flow sensor 12, detection accuracy of flow rates can be maintained.

In addition, the cavity portion can be made smaller, so that the strength of the cavity portion beomes higher, thus making it possible to provide a highly reliable flow detector element 1.

While the presently preferred embodiment of the present invention has been shown and described, it is to be understood that these disclosures are for the purpose of illustration and that various changes and modifications may be made without departing from the scope of the invention as set forth in the appended claims.

What is claimed is:

1. A flow detector element comprising:
   a substrate;
   a support film formed on a surface of said substrate;
   a heat resistor and a fluid temperature-measuring resistor formed on said support film;
   a first cavity; and
   a second cavity,
   wherein said heat resistor and said fluid temperature-measuring resistor are made of a thermosensible resistive film,
   wherein said first cavity is provided under said heat resistor and said second cavity is provided under said fluid temperature-measuring resistor,
   wherein said first cavity and said second cavity are formed by removing a part of said substrate under said heat resistor and said fluid temperature-measuring resistor, respectively, and wherein a top surface of said second cavity is smaller than said fluid temperature-measuring resistor, such that said top surface of said second cavity is formed within a portion where said fluid temperature-measuring resistor is located.

2. The flow detector element according to claim 1, wherein said top surface of said second cavity is smaller than a top surface of said first cavity.

* * * * *